US010970919B2

(12) United States Patent
Dingeldey

(10) Patent No.: US 10,970,919 B2
(45) Date of Patent: Apr. 6, 2021

(54) METHOD OF DETERMINING AN ILLUMINATION EFFECT OF A VOLUMETRIC DATASET

(71) Applicant: Siemens Healthcare GmbH, Erlangen (DE)

(72) Inventor: Felix Dingeldey, Erlangen (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 0 days.

(21) Appl. No.: 16/703,084

(22) Filed: Dec. 4, 2019

(65) Prior Publication Data

US 2020/0193695 A1 Jun. 18, 2020

(30) Foreign Application Priority Data

Dec. 14, 2018 (EP) .................................... 18212583

(51) Int. Cl.
| | |
|---|---|
| *G06T 15/50* | (2011.01) |
| *G06F 30/20* | (2020.01) |
| *G06T 15/08* | (2011.01) |
| *G06F 111/10* | (2020.01) |

(52) U.S. Cl.
CPC ............ *G06T 15/506* (2013.01); *G06F 30/20* (2020.01); *G06T 15/08* (2013.01); *G06F 2111/10* (2020.01); *G06T 2210/41* (2013.01)

(58) Field of Classification Search
None
See application file for complete search history.

(56) References Cited

U.S. PATENT DOCUMENTS

| 7,184,052 B2 * | 2/2007 | Wang | G06T 15/04 |
| | | | 345/420 |
| 7,689,035 B2 * | 3/2010 | Mallick | G06T 5/30 |
| | | | 382/163 |

OTHER PUBLICATIONS

Bergner, S., Moller, T., Drew, M., Finlayson, G., Interactive Spectral Volume Rendering, Oct. 2002, Proceedings of the conference on Visualization '02, pp. 101-108. (Year: 2002).*
Blinn, James F. "Models of Light Reflection for Computer Synthesized Pictures" SIGGRAPH '77, Proceedings of the 4th annual conference on Computer graphics and interactive techniques, pp. 192-198, Jul. 20-22, 1977 // DOI: 10.1145/563858.563893.
Kindlmann, Gordon et al. "Hue-Balls and Lit-Tensors for Direct Volume Rendering of Diffusion Tensor Fields" Proceedings Visualization '99 (Cat. No. 99CB37067), Oct. 24-29, 1999 // DOI: 10.1109/VISUAL.1999.809886.

(Continued)

*Primary Examiner* — Said Broome
(74) *Attorney, Agent, or Firm* — Harness, Dickey & Pierce, P.L.C.

(57) ABSTRACT

A method of determining an illumination effect value of a volumetric dataset includes determining, based on the volumetric dataset, one or more parameter values relating to one or more properties of the volumetric dataset at a sample point; and providing the one or more parameter values as inputs to an anisotropic illumination model and thereby determining an illumination effect value relating to an illumination effect at the sample point, the illumination effect value defining a relationship between an amount of incoming light and an amount of outgoing light at the sample point.

22 Claims, 5 Drawing Sheets

(56) References Cited

OTHER PUBLICATIONS

Ashikhmin, Michael et al. "An Anisotropic Phong BRDF Model" Journal of Graphics Tools, vol. 5, No. 2, pp. 25-32, Apr. 2012 // https://doi.org/10.1080/10867651.2000.10487522.

Dong, Feng et al. "Volumetric texture synthesis for non-photorealistic volume rendering of medical data" Visual Comput, vol. 21, pp. 463-473, Jul. 2005 // DOI: 10.1007/s00371-005-0294-2.

Csébfalvi, Balázs et al. "Fast Visualization of Object Contours by Non-Photorealistic Volume Rendering" EUROGRAPHICS, vol. 20, No. 3, pp. 452-460, 2001.

Cabral, Brian et al. "Imaging Vector Fields Using Line Integral Convolution" SIGGRAPH '93, Proceedings of the 20th annual conference on Computer graphics and interactive techniques, pp. 263-270, Aug. 2-6, 1993 // DOI: 10.1145/166117.166151.

Kniss, Joe et al. "Interactive Translucent Volume Rendering and Procedural Modeling" IEEE Visualization (VIS), Oct. 27-Nov. 1, 2002 // DOI: 10.1109/VISUAL.2002.1183764.

Montes, Rosana et al. "An Overview of BRDF Models" Technical Report LSI-2012-001, University of Granada, Mar. 8, 2012.

Kroes, Thomas et al. "Exposure Render: An Interactive Photo-Realistic Volume Rendering Framework" PLOS ONE; vol. 7, No. 7, Jul. 2012 // DOI: 10.1371/journal.pone.0038586.

Kautz, Jan et al. "Towards Interactive Bump Mapping with Anisotropic Shift-Variant BRDFs" SIGGRAPH/Eurographics Workshop on Graphics Hardware, pp. 51-58, 2000 // http://dx.doi.org/10.2312/EGGH/EGGH00/051-058.

Kindlmann, Gordon et al. "Curvature-Based Transfer Functions for Direct Volume Rendering: Methods and Applications" IEEE Visualization (VIS), Oct. 19-24, 2003 // DOI: 10.1109/VISUAL.2003.1250414.

Ward, Gregory J. "Measuring and Modeling Anisotropic Reflection" SIGGRAPH '92, Proceedings of the 19th annual conference on Computer graphics and interactive techniques, pp. 265-272, 1992 // DOI: 10.1145/133994.134078.

Ament, Marco et al. "Anisotropic Ambient Volume Shading" IEEE Transactions on Visualization and Computer Graphics, vol. 22, No. 1, pp. 1015-1024, Jan. 31, 2016 // DOI: 10.1109/TVCG.2015.2467963.

Phong, Bui Tuong "Illumination for Computer Generated Pictures" Communications of the ACM, vol. 18, No. 6, pp. 311-317, Jun. 1975.

European Search Report for European Patent Application No. 18212583 dated Mar. 20, 2019.

* cited by examiner

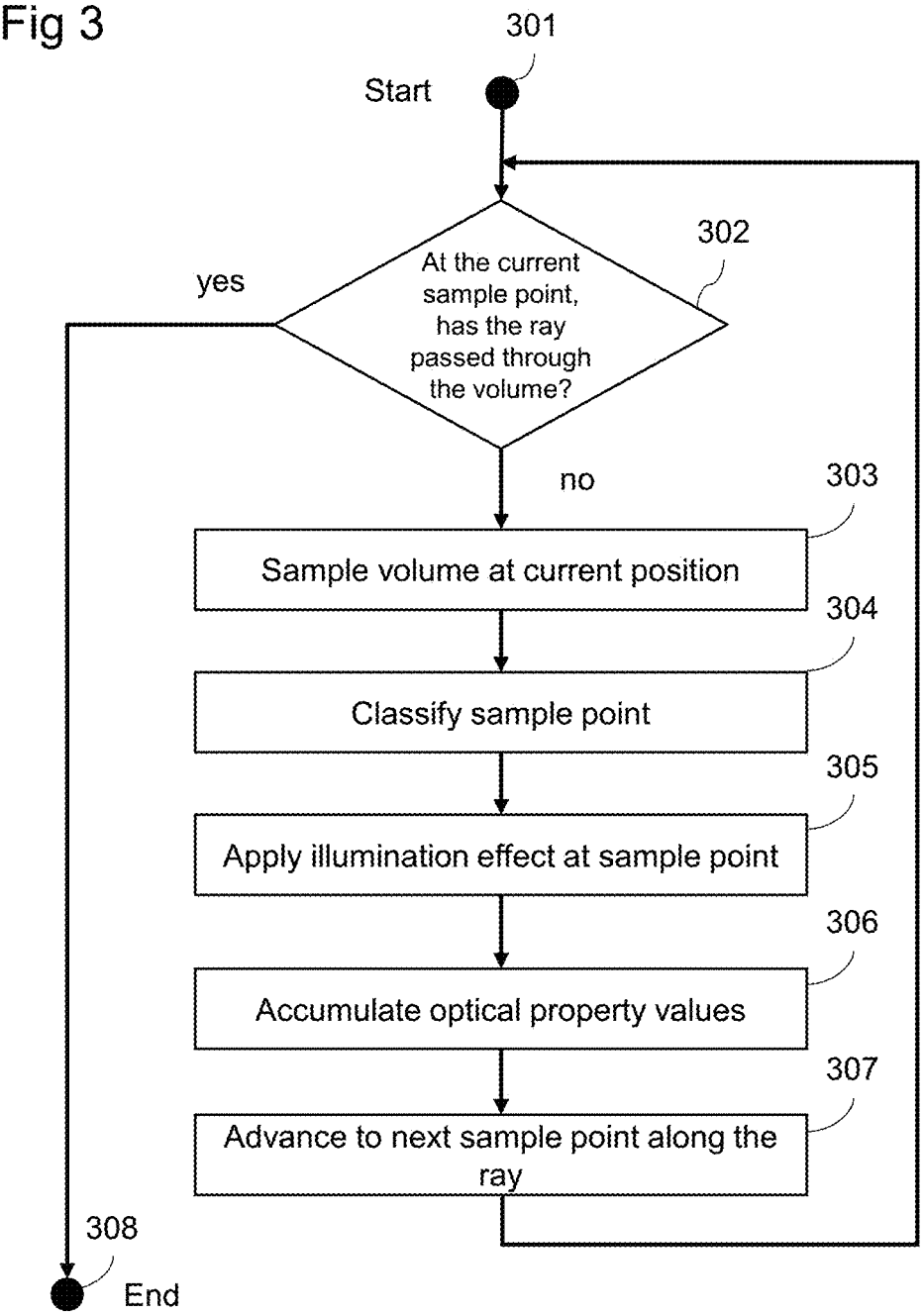

METHOD OF DETERMINING AN ILLUMINATION EFFECT OF A VOLUMETRIC DATASET

PRIORITY STATEMENT

The present application hereby claims priority under 35 U.S.C. § 119 to European patent application number EP 18212583.1 filed Dec. 14, 2018, the entire contents of which are hereby incorporated herein by reference.

FIELD

Embodiments of the invention generally relate to providing an illumination effect value of a volumetric dataset, and to a method of direct volume rendering of a volumetric dataset.

BACKGROUND

Visualization of a volumetric dataset may comprise a process which may be referred to as volume rendering. Volume rendering may, for example, be used as part of a medical imaging process, for example to visualize a volumetric dataset gathered by a data gathering process. In the field of medicine, volume rendering may allow for a radiologist, a surgeon or a therapist to understand and interpret volumetric data and may support communication with the patient and may also support education of medical practitioners.

Visualization of medical datasets may be used for example, for diagnosis, teaching, patient communication etc. Visualization of volumetric data is also applied in numerous other technical fields, for example in geological, industrial quality assurance and scientific simulations.

SUMMARY

According to a first embodiment of the present invention, there is provided a method of determining an illumination effect value of a volumetric dataset, the method comprising: determining, based on the volumetric dataset, one or more parameter values relating to one or more properties of the volumetric data set at a sample point; providing the one or more parameter values as inputs to an anisotropic illumination model and thereby determining an illumination effect value relating to an illumination effect at the sample point, the illumination effect value defining a relationship between an amount of incoming light and an amount of outgoing light at the sample point.

According to a second embodiment of the present invention there is provided a method of performing direct volume rendering of a volumetric dataset comprising: simulating a plurality of rays converging at a viewpoint and passing through the volumetric dataset; selecting a plurality of sample points in the volumetric dataset along each of the plurality of rays; classifying one or more optical properties of each of the sample points; determining, for a given sample point of the plurality of sample points, an illumination effect value relating to an illumination effect at the given sample point by the method according to the first embodiment of the present invention; determining, for the given sample point, a value of one or the optical properties at the sample point based on the classification of the optical property at the sample point and the determined illumination effect value at the sample point; and accumulating along each simulated ray values of the optical properties determined for each sample point along the ray to thereby obtain an accumulated value of the optical properties for use in rendering the volumetric dataset.

According to a third embodiment of the present invention there is provided a set of machine-readable instructions which when executed by a processor cause a method according to the first embodiment or the second embodiment to be performed.

According to a fourth embodiment of the present invention there is provided a machine-readable medium comprising a set of machine-readable instructions according to the third embodiment.

According to a fifth embodiment of the present invention there is provided apparatus comprising a processor and a storage comprising a set of machine-readable instructions which when executed by the processor cause the processor to perform a method according to the first embodiment or the second embodiment.

According to an embodiment of the present invention, there is provided a method of determining an illumination effect value of a volumetric dataset, the method comprising:
    determining, based on the volumetric dataset, one or more parameter values relating to one or more properties of the volumetric dataset at a sample point; and
    providing the one or more parameter values as inputs to an anisotropic illumination model and thereby determining an illumination effect value relating to an illumination effect at the sample point, the illumination effect value defining a relationship between an amount of incoming light and an amount of outgoing light at the sample point.

According to an embodiment of the present invention, there is provided a method of performing direct volume rendering of a volumetric dataset, comprising:
    simulating a plurality of rays converging at a viewpoint and passing through the volumetric dataset;
    selecting a plurality of sample points in the volumetric dataset along each of the plurality of rays;
    classifying one or more optical properties of each of the sample points;
    determining, for a respective sample point of the plurality of sample points, a respective illumination effect value relating to an illumination effect at the respective sample point by a method of an embodiment;
    determining, for the respective sample point, a respective value of one of the optical properties at the respective sample point based on the classification of the optical property at the respective sample point and the respective illumination effect value determined at the respective sample point; and
    accumulating, along each respective simulated ray of the plurality of rays, values of the optical properties determined for each respective sample point along the respective simulated ray to thereby obtain an accumulated value of the optical properties for use in rendering the volumetric dataset.

BRIEF DESCRIPTION OF THE DRAWINGS

FIG. 3 illustrates a flow chart representation of a method of rendering a volumetric dataset, according to an example embodiment;

DETAILED DESCRIPTION OF THE EXAMPLE EMBODIMENTS

Figure 1:
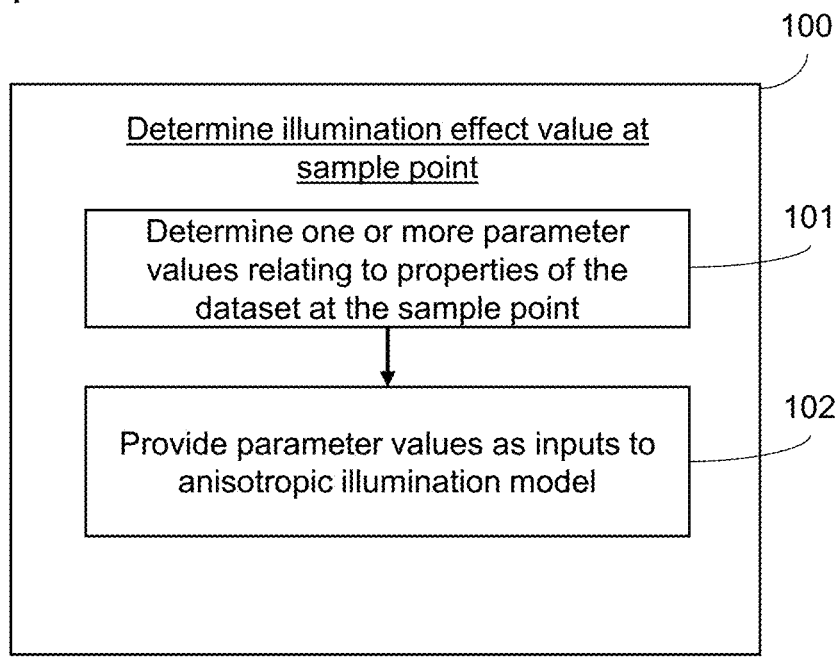
FIG. 1 illustrates a flow chart representation of an example method of determining an illumination effect value for a volumetric dataset.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without subdividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

According to a first embodiment of the present invention, there is provided a method of determining an illumination effect value of a volumetric dataset, the method comprising: determining, based on the volumetric dataset, one or more parameter values relating to one or more properties of the volumetric data set at a sample point; providing the one or more parameter values as inputs to an anisotropic illumination model and thereby determining an illumination effect value relating to an illumination effect at the sample point, the illumination effect value defining a relationship between an amount of incoming light and an amount of outgoing light at the sample point.

The anisotropic illumination model may be an ellipse-based model comprising one or more parameters defining a mathematical model of an ellipse, and the one or more parameter values relating to one or more properties at the sample point may be provided as input values for the one or more parameters defining an ellipse.

The one or more parameter values relating to one or more properties at the sample point may be values relating to a curvature at the sample point.

At least one of the values relating to the curvature at the sample point may be a principal curvature value or a principal curvature direction value.

The determined illumination effect value may be a specular term of a bi-directional reflection distribution function (BRDF).

The anisotropic illumination model may be defined according to the expression:

$$f_{s,1} = \frac{\sqrt{(e_T+1)(e_B+1)}}{8\pi} \cdot \frac{(N \cdot L)^{e_T \cos^2\phi_h + e_B \sin^2\phi_h}}{(N \cdot L) \cdot \max((N \cdot L), (N \cdot V))} \cdot F_r((V \cdot H))$$

wherein:

$f_{s,1}$ is the illumination effect value and is the specular term of the BRDF;

$e_T$ and $e_B$ are the parameters which define an ellipse;

N is a normal vector at the sample point;

L is a light vector at the sample point;

V is a viewing vector at the sample point;

H is a halfway vector being halfway between L and V and is defined as $$H = \frac{L+V}{\|L+V\|};$$

$F_r$ is a Fresnel term; and $\phi_h$ is an azimuthal angle between H and a tangent vector T.

The anisotropic illumination model may be defined according to the expression:

$$f_{s,2} = \frac{1}{\sqrt{\cos\theta_i \cos\theta_o}} \cdot \frac{\exp\left(-\tan^2\theta_h\left(\frac{\cos^2\phi_h}{e_T} + \frac{\sin^2\phi_h}{e_B}\right)\right)}{4\pi e_T e_B}$$

wherein:

$f_{s,2}$ is the illumination effect value and is the specular term of the BRDF;

$e_T$ and $e_B$ are the parameters which define an ellipse;

$\theta_i$ is an elevation angle between a normal vector N at the sample point and a light vector L at the sample point;

$\theta_0$ is an elevation angle between the normal vector N and a viewing vector V;

$\theta_h$ is an elevation angle between the normal vector N and a halfway vector H, wherein H is a vector halfway between L and V and is defined as $$H = \frac{L+V}{\|L+V\|};$$

and $\phi_h$ is an azimuthal angle between the halfway vector H and a tangent vector T.

The anisotropic illumination model may be defined according to the expression:

$$f_{s,3} = \left(\sqrt{\left(1 - \left(\frac{\cos^2\phi_h}{e_T} - \frac{\sin^2\phi_h}{e_B}\right)\right)}\right)^a$$

wherein:

$f_{s,3}$ is the illumination effect value being determined and is the specular term of the BRDF;

$e_T$ and $e_B$ are the parameters which define an ellipse;

a is a constant defining a shininess of a material associated with the sample point; and $\phi_h$ is an azimuthal angle between a halfway vector H and a tangent vector T, wherein H is a vector halfway between L and V and is defined as $$H = \frac{L+V}{\|L+V\|}.$$

Providing the one or more parameter values as inputs to the anisotropic illumination model may comprise providing one of the one or more parameter values as input values for one of the parameters $e_T$ and $e_B$.

Providing one of the one or more parameter values as input values for each of $e_T$ and $e_B$ may comprise providing parameter values for $e_T$ and $e_B$ as follows:

$n\ \hat{\kappa}_1^{abs}$ and $n\ \hat{\kappa}_2^{abs}$, or $n(1 - \hat{\kappa}_1^{abs})$ and $n(1 - \hat{\kappa}_2^{abs})$, or $n\frac{\min(\hat{\kappa}_1^{abs}, \hat{\kappa}_2^{abs})}{\max(\hat{\kappa}_1^{abs}, \hat{\kappa}_2^{abs})}$ and $n$, wherein $(\hat{\kappa}_1^{abs}, \hat{\kappa}_2^{abs}) = \left(\frac{(|\kappa_1|, |\kappa_2|)}{\|(|\kappa_1|, |\kappa_2|)\|}\right)$; or $n \cdot \tilde{K}$ and $n$, or $n \cdot \tilde{H}$ and $n$, wherein $\tilde{K} = \hat{\kappa}_1 \hat{\kappa}_2$, $\tilde{H} = (\hat{\kappa}_1 + \hat{\kappa}_2)/2$, and $(\hat{\kappa}_1, \hat{\kappa}_2) = \left(\frac{(\kappa_1, \kappa_2)}{\|(\kappa_1, \kappa_2)\|}\right)$;

wherein n is a normalisation value dependent on the anisotropic illumination model being used.

The method according to the first embodiment may comprise providing principal curvature directions as inputs for the tangent vector T and the bitangent vector B, such that the tangent vector T and the bitangent vector B are each aligned with one of the principal curvature directions at the sample point.

According to a second embodiment of the present invention there is provided a method of performing direct volume rendering of a volumetric dataset comprising: simulating a plurality of rays converging at a viewpoint and passing through the volumetric dataset; selecting a plurality of sample points in the volumetric dataset along each of the plurality of rays; classifying one or more optical properties of each of the sample points; determining, for a given sample point of the plurality of sample points, an illumination effect value relating to an illumination effect at the given sample point by the method according to the first embodiment of the present invention; determining, for the given sample point, a value of one or the optical properties at the sample point based on the classification of the optical property at the sample point and the determined illumination effect value at the sample point; and accumulating along each simulated ray values of the optical properties determined for each sample point along the ray to thereby obtain an accumulated value of the optical properties for use in rendering the volumetric dataset.

According to a third embodiment of the present invention there is provided a set of machine-readable instructions which when executed by a processor cause a method according to the first embodiment or the second embodiment to be performed.

According to a fourth embodiment of the present invention there is provided a machine-readable medium comprising a set of machine-readable instructions according to the third embodiment.

According to a fifth embodiment of the present invention there is provided apparatus comprising a processor and a storage comprising a set of machine-readable instructions which when executed by the processor cause the processor to perform a method according to the first embodiment or the second embodiment.

FIG. 1 illustrates a flow chart representation of an example method 100 of determining an illumination effect value of a volumetric dataset. The method 100 comprises, at block 101, determining one or more parameter values relating to one or more properties of the dataset at a sample point. Examples of parameter values relating to properties of the dataset and which may be determined at block 101 include values relating to curvature at the sample point, but also may relate to other values relating to the sample point, as will be discussed below.

At block 102, the method comprises providing the one or more parameter values relating to one or more properties of the dataset at the sample point as inputs to an anisotropic illumination model. As referred to in examples herein, an illumination model is a mathematical model which may be used to simulate the interaction of light with a point in a volume. An illumination model may be defined by a mathematical expression for providing an illumination effect value at the sample point. In some examples, a mathematical expression defining an illumination model comprising one or more parameters, for which parameter values relating to the sample point may be input such that the expression provides an illumination effect value for the sample point. Types of illumination models include isotropic and anisotropic models, and examples of anisotropic illumination models which may be used in example methods such as the method 100 will be discussed below.

By inputting the one or more parameters relating to the sample point into the anisotropic illumination model, the method 100 determines an illumination effect value for the volumetric dataset. The illumination effect value defines a relationship between an amount of incoming light and an amount of outgoing light at the sample point. For example, the illumination effect value may in one example be a value at least partly defining a bi-directional reflection distribution function at the sample point. Examples of illumination effect values which may be determined by the example method 100 will be discussed below.

The example method 100 may be performed, for example, during a method of rendering, for example direct volume rendering, of a volumetric dataset.

Figure 2:
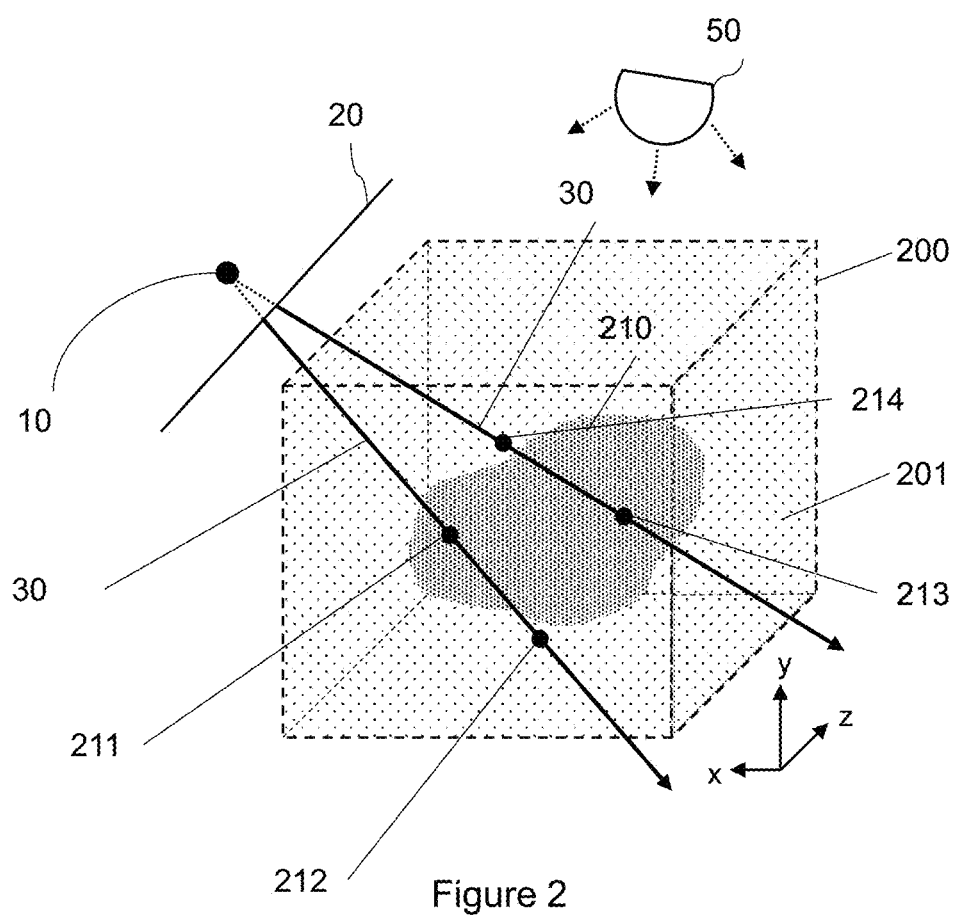
FIG. 2 illustrates schematically part of an example method of rendering a volumetric dataset, according to an example embodiment.

FIG. 2 illustrates schematically a volumetric dataset 200 and an example method of rendering the volumetric dataset 200. The volumetric dataset 200 may be referred to herein as the volume 200 or the dataset 200.

In one example the volumetric dataset 200 comprises a discrete sampling of a scalar field. For example, the volumetric dataset 200 may comprise a 3D medical dataset. Such a medical dataset may be received by loading from a memory, sensors, and/or other sources. Such a medical dataset may represent a part of a patient, for example a human or animal patient. In general, any scanning modality which will produce a 3D volumetric dataset may be used to produce the volumetric dataset 200. For example, the scanning modality may comprise the use of computed tomography (CT), or of magnetic resonance imaging (MRI). In some examples a scanning modality comprising the use of positron emission tomography (PET), single photon emission computed tomography (SPECT), ultrasound, or another scan modality may be used. Scan data may be provided in the form of multiple two-dimensional (2D) scans or may be formatted from a 3D scan. In some examples, the volumetric dataset 200 is a DICOM dataset created by scanning at least a portion of a patient using a scanning modality. In other examples, values making up the volumetric dataset 200 may represent geological data (e.g. gathered using seismic data), or as part of industrial quality assurance (e.g. gathered using industrial x-ray scans). In other examples, the volumetric dataset 200 may comprise values representing an object produced via a scientific model rather than measured values representing a physical object.

In examples, the volumetric dataset 200 may comprise data formatted as a plurality of voxels 201. The voxels 201 may, for example, be in a uniform or non-uniform 3D grid, or may be arranged in some other type of geometry (e.g., polar coordinate format). Each voxel 201 may represent a scalar value, such as scalar value obtained by sampling a scalar field, as described above. The type of scalar value represented by each voxel 201 may be dependent on the means by which the volumetric dataset 200 is obtained. For example, where a CT scanner is used to produce the volumetric dataset 200, the dataset may comprise Hounsfield values. In this example, the volumetric dataset 200 comprises a representation of an object 210, which may be a representation of a portion of a medical patient or the like.

An example method of visualising the volumetric dataset 200 shown in FIG. 2 comprises defining a viewpoint 10 with respect to the volumetric dataset 200. A viewing plane 20 is also defined and placed in front of the viewpoint 10. The viewing plane 20 comprises a number of pixels (not shown in the figures), e.g. arranged in a grid, and allows construction of a 2D visualisation of the 3D volumetric dataset 200, as viewed from the viewpoint 10. Some example methods of visualising the volumetric dataset 200 may be referred to as direct volume rendering. In an example, direct volume rendering comprises traversing a number of simulated rays 30, 31 through the volumetric dataset 200, wherein each of the rays 30, 31 intersects the viewing plane 20 and the rays 30 are convergent at the viewpoint 10. For example, one ray, or more than one ray, may be traversed through the volume 200 for each pixel of the viewing plane 20.

Each ray, e.g. ray 30, which is traversed through the volume 200 may allow determination of a value or set of values for display by a pixel of viewing plane 20 which is intersected by that ray. For example, a rendering algorithm may be employed which determines a value for display by the pixel via a calculation taking into account the path of the ray 30 through the volume 200. In some examples, a colour and brightness for the pixel may be determined via traversing a ray 30 through the volume 200 from the viewpoint 10 and calculating the effect on the ray 30 of accumulated optical properties of parts of the volume 200 which lie along a path of the ray 30. Such an example method may be referred to as direct volume rendering by ray casting.

In examples, points in the volume 200 are classified and assigned one or more optical parameters which define how that point of the volume 200 affects a ray 30 intercepting that point. For example, the effect of a voxel 201 of the volume 200 on a ray 30 may be defined by a set of parameters assigned to the voxel 201 and assigning optical properties to the voxel 201. In one example, a set of optical parameters assigned to each voxel 201 comprises an opacity and a colour. In examples, the set of parameters defining each voxel 201 is determined via use of a transfer function. A transfer function may assign optical parameters to the voxel 201 based on, for example, at least the scalar value of that voxel 201 of the volume 200. In some examples, additional properties related to the voxel 201, such as a gradient of the scalar values of the volumetric dataset 201 at the voxel, may be used as an input into a transfer function and therefore may affect the optical property/properties assigned to the voxel 201.

In other examples, a transfer function may assign to a given point in the volume 200 one or more of: a scattering coefficient, a specular coefficient, a diffuse coefficient, a scattering distribution function, a bidirectional transmittance distribution function, a bidirectional reflectance distribution function, and colour information. These parameters may be used to derive a transparency, reflectivity, surface roughness, and/or other properties of the surface of the given point. These surface material properties may be derived based on scalar values of the volumetric dataset at the rendering location, and/or based on user-specified parameters.

In examples, a plurality of sample points within the volumetric dataset 200 along the path of the ray 30 are selected. For example, sample points may be selected at regular intervals along the ray 30. In FIG. 2, a first sample point 211 and a second sample point 212 along the ray 30 is shown, while the ray 31 comprises a plurality of sample points 213, 214. In examples, some sample points may lie outside of the volume 200 and thus will not contribute to the value/s for display by the pixel with which the ray is associated. It will be appreciated that in some examples sample point locations may be chosen using an algorithm which improves efficiency of the volume rendering method.

It should be noted that at least some of the sample points may not be coincident with a voxel 201 and as such calculations relating to a particular sample point, such as use of the transfer function, may employ interpolation to determine a scalar value at that sample point. For example, the first point 211 may not be coincident with one of the voxels 201. Trilinear interpolation, or another example method of interpolation, based on the scalar values of a set of voxels neighbouring the first point 211 may then be performed to determine an interpolated scalar value for the first point 211. Classifying of the point 211 may then comprise applying the transfer function to the interpolated value of the volumetric dataset 200 at the sample point 211. Similarly, a gradient of the scalar values of the volume 200 at the point 211 may be interpolated from neighbouring gradient values or may use interpolated scalar values and determine a gradient from those interpolated values. It will be appreciated that interpolation may be done before applying a transfer function or the like, or values resulting from application of such a function may themselves be interpolated for use in methods herein.

In this example and in other examples, a rendering algorithm, in determining an accumulated optical property, such as opacity and colour along the path of each ray 30, 31, models an effect on the values for accumulating for each sample point 211 of illumination of the volume 200. In this example method, the volume 200 is illuminated by a model light source 50.

In examples, the light source 50 may be a point source, a directional light source, or may comprise a light map. The simulation light source may also be any other kind of light source—e.g. a model of any object which emits light—or a combination of multiple different light sources. In some examples, parts of the volumetric dataset itself may emit light. In some examples, the light source may comprise a high definition light map. The light map in some examples may have six sides corresponding to outer sides of the volumetric dataset where the volume is cuboidal, for example.

Now with reference to FIG. 3 an example method of rendering the volumetric dataset 200 is illustrated with a flowchart representation, starting at 301. As described with reference to FIG. 2, the method shown in FIG. 3 comprises traversing a plurality of rays 30, 31, originating at the viewpoint 10 through the volume 200. The rays 30, 31 have positioned along them a plurality of sample points, e.g. sample points 211, 212, 213, 214, etc. Each iteration of blocks 302 to 307 of the illustrated method, represents actions performed at a given sample point along one of the rays 30, 31 being traversed.

At block 302 it is determined whether the current sample point being considered is outside of the volume 200, i.e. at a point where the ray 30 upon which the sample point lies has already passed through the volume. If the answer to this is "yes", then the method ends with action 308, since this indicates that traversing of the ray 30 through the volume 200 is complete. If the current position at along the ray 30 is within the volume 200 then the volume may be sampled at block 303.

At block 304, in this example, the sample point being sampled is classified. This may comprise application of the transfer function at the sample point, as described above with reference to FIG. 2, for example to determine optical properties, e.g. opacity and colour, of the sample point of accumulating along the ray 30.

At block 305 an illumination effect is applied at the sample point. Applying an illumination effect at the sample point, comprises determining an illumination effect value by performing a method according to example methods described with reference to FIG. 2. The illumination effect value may then be used to modulate one or more of the one or more optical properties, such as colour and opacity, determined at block 304 by classification of the sample point. As such, a value of the one or more optical properties may be determined for the sample point based on the classification of the sample point and the determined illumination effect value. For example, a colour value determined for the sample point by classification of the sample point may be modulated according to the determined illumination effect value to produce a modulated colour value for the sample point. Further details of example methods of determining an illumination effect value at a sample point will be discussed in more detail below with reference to FIGS. 4a and 4b.

At block 306 the one or more optical property values determined at block 305 are accumulated into a sum of the one or more optical property values along the ray 30. At block 307 the method advances to the next sample point, e.g. advances from first sample point 211 to second sample point 212, and repeats block 302 (and blocks 303 to 307, where appropriate) of the above-described example method. The method thereby results in an accumulated value of the one or more optical properties determined for each sample point, to thereby obtain an accumulated value of the one or more optical properties for use in rendering the volumetric dataset. For example, as described above, the method described with reference to FIG. 3 may allow accumulated values of opacity and colour along the ray 30 to be obtained which may be used for determining values for display by a pixel in the viewing plane 20.

Example methods of applying an illumination effect during example methods of volume rendering may add realism to an image rendered of the volume 200. For example, illumination effects may assist a user in interpreting objects, surfaces, and/or material boundaries represented by the volumetric dataset 200. For example, illumination effects may help to convey visual shape information of a rendered object to a user.

In examples, a local illumination model may be used to model the interaction of light with the volume 200. In general, when considering a particular point in the volume, such as the first sample point 211, a local illumination model may consider only light directly incident from the light source 50 on that particular point. A global illumination model, in contrast, may consider light which has arrived at the point in the volume from other points in the volume, for example via scattering or refraction. Local illumination models may, in some examples, involve a lower number of calculations for a given volume than a global illumination model, and therefore a local illumination model may provide less of a burden on computational resources than a global illumination model. Details of particular local illumination models will be returned to below.

In example methods of direct volume rendering, an overall contribution of colour from the point 211, taking into account the colour of the point 211 determined from the transfer function and any light scattered into or out of the ray 30 by the point 211, can be determined. This technique is derived from the physical approximation of the interaction of light with the volume which may simply be referred to as the rendering equation. In an example rendering algorithm, the overall effect of this point 211 on the ray 30 may be accumulated, e.g. via a summation operation, in order to solve the rendering equation. The algorithm may then comprise continuing to traverse the ray 30, moving to another sample point 212. The algorithm may thus integrate along the path of the ray, by accumulating colour and opacity modified by an illumination effect value at each sample point and thereby determining a colour and brightness of the pixel associated with the ray 30. In an example, the described sampling and accumulation is performed for only sample points which are within the volumetric dataset 200. That is, in this example, points along the ray 30 which do not lie within the volumetric dataset 200 do not contribute to the accumulated values determined for the ray 30.

Figure 4A:
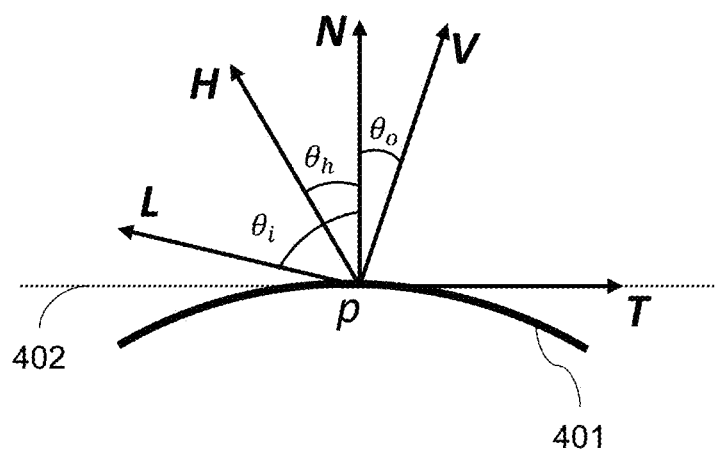
FIG. 4a and FIG. 4b illustrate schematically a portion of a volumetric dataset and associated vectors for use in an example method of determining an illumination effect value.
Figure 4B:
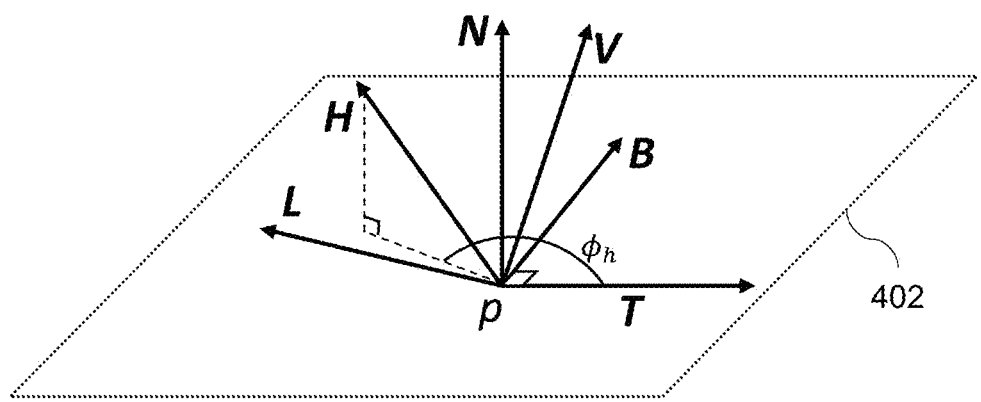

Example methods of determining an illumination effect value for use in a method of rendering such as described with reference to FIG. 3 will now be described with reference to FIG. 4a and FIG. 4b. In FIG. 4a and FIG. 4b a point p in the volumetric dataset 200 and vectors associated with the point p are shown for the purposes of illustrating an example local illumination model for determining an illumination effect value. The point p is on a surface 401 which is the isosurface formed by the set of points having the same scalar value as that of the point p. With reference to FIG. 4a and FIG. 4b:

N is a surface normal perpendicular to a tangent plane 402 at point p, where the tangent plane 402 is represented by a dotted line;

T is a tangent vector orthogonal to the normal N and lying within the tangent plane 402;

B is a bitangent vector orthogonal to the normal N and tangent T vectors and also lying in the tangent plane—the three vectors N, T and B form an orthonormal basis with their origin at point p;

L is a light direction vector, pointing from the point p towards an incident light source, such as light source 50 of FIG. 2;

V is a viewing direction vector, pointing to a viewing point, e.g. in FIG. 2 pointing to the viewpoint 10 along the direction of a ray 30;

H is a halfway vector between L and V defined as $$H = \frac{L+V}{\|L+V\|},$$

as used in the Blinn-Phong model for computational efficiency in local illumination calculations;

φ is an azimuthal angle, describing the rotation of a vector projected onto the tangent plane 402 around the normal vector N, wherein $\phi_h$ is an example azimuthal angle shown in FIG. 4b and is an azimuthal angle between the halfway vector H and tangent vector T;

θ is an elevation angle, describing the angle between a vector and the surface normal N; wherein $\theta_i$ is an angle of elevation of the light vector L (i.e. an angle of incidence), $\theta_o$ is an angle of elevation of the viewing vector V (i.e. an angle of outgoing light), and $\theta_h$ is an angle of elevation of the halfway vector H;

wherein all vectors described above are normalised to unit length.

Referring to the scalar field represented by the volumetric dataset 200 as s, we can define a gradient vector g at the point p as $$g = \left[\frac{\partial s}{\partial x}, \frac{\partial s}{\partial y}, \frac{\partial s}{\partial z}\right]$$

and the normal vector N is then $$N = -\frac{g}{\|g\|}$$

In some examples, an illumination effect value determined by examples methods described herein may be a value relating to a bi-directional reflection distribution function (BRDF), which is a function which models the ratio of reflected radiance leaving a surface point in a particular direction to irradiance incident on the surface point from another defined direction. The BRDF therefore may provide a ratio of outgoing light along a given viewing direction V given a light direction L, and the BRDF is termed herein: $f_r=(L,V)$. It will be appreciated that, in examples, multiple incident light sources may be modelled, or for example, a light field may be used to model light incident on the volume 200. Therefore, in order to calculate an illumination effect value at the point p, a sum of the contributions of the light sources present (where each may have at least one light source vector) may be determined to arrive at a final illumination effect value for the point p.

In examples, the BRDF may be based on a local illumination model, wherein the BRDF is represented with a diffuse term and a specular term, as follows:

$$f_r=(L,V)=k_d f_d(L,V)+k_s f_s(L,V)$$

wherein $f_d(L,V)$ is the diffuse term and $k_d$ a constant weighting the diffuse term; and wherein $f_s(L,V)$ is the specular term and $k_s$ a constant weighting the specular term.

Some example methods herein are methods of determining the specular term of a local illumination BRDF as formulated above. In some known examples, the specular term of the BRDF is an isotropic term. That is, it is dependent on the angles of elevation of the light vector L and viewing vector V to the surface normal N, $\theta_i$ and $\theta_o$ respectively. An isotropic specular term may also be dependent on the difference in azimuthal angle φ between the light vector L and the viewing vector V, but is not dependent on the actual values of the azimuthal angles of the light vector L and the viewing vector V respectively.

In modelling illumination of certain types of surface, for example, brushed metal, satin, fur or vinyl or the surface of a compact disc, instead of an isotropic specular term, use of an anisotropic specular term may be appropriate, and may provide additional visual information to be imparted to a user. Examples of the present disclosure involve the use of an anisotropic illumination model, for example in a method of direct volume rendering as described with reference to FIG. 2 and FIG. 3. Examples of suitable anisotropic illumination models will now be described.

In some examples, a suitable anisotropic illumination model is an ellipse-based model. Here, an ellipse-based anisotropic illumination model is an illumination model which comprises one or more parameters which define a mathematical model of an ellipse. An ellipse-based anisotropic illumination model may be used to determine a specular component of a BRDF and may result in elliptically shaped specular reflection highlights when applied as an illumination effect in rendering a volumetric dataset. An ellipse-based anisotropic illumination model may, for example, comprise scalar parameters $e_T$ and $e_B$ which define lengths of major axes of an ellipse and thus the elongation of the ellipse. The orientation of the ellipse in such a model may be determined by the parameters $\cos \phi_h$ and $\sin \phi_h$; and it should be noted that, as follows from the geometry represented by FIGS. 4a and 4b, cos $\phi_h$=(H·T) and sin $\phi_h$=(H·B). As such, the tangent vector T, and the bitangent vector B, in examples may effectively control the orientation of an elliptical specular highlight determined by application of an ellipse-based anisotropic illumination model.

Examples of anisotropic illumination models which comprise parameters defining an ellipse and may be used to determine an illumination effect value in methods herein are shown below.

In a first example an ellipse-based anisotropic illumination model determines a specular term of the BRDF and is defined by the following expression (1):

$$f_{s,1} = \frac{\sqrt{(e_T+1)(e_B+1)}}{8\pi} \cdot \frac{(N \cdot L)^{e_T \cos^2 \phi_h + e_B \sin^2 \phi_h}}{(N \cdot L) \cdot \max((N \cdot L), (N \cdot V))} \cdot F_r((V \cdot H))$$

wherein, in expression (1), $e_{T,B} \in \mathbb{R}^+$, i.e. $e_{T,B}$ may take the value of any of the set of real numbers not including 0. In expression (1) $F_r$ represents a Fresnel term.

In another example an ellipse-based anisotropic illumination model determines a specular term of the BRDF and is defined by the following expression (2):

$$f_{s,2} = \frac{1}{\sqrt{\cos\theta_i \cos\theta_o}} \cdot \frac{\exp\left(-\tan^2\theta_h \left(\frac{\cos^2\phi_h}{e_T} + \frac{\sin^2\phi_h}{e_B}\right)\right)}{4\pi e_T e_B}$$

wherein, in expression (2) $e_{T,B} \in (0,1]$. That is, $e_{T,B}$ may be any real number greater than 0 and less than or equal to 1. In expression (2), as described above with reference to FIGS. 4a and 4b, $\theta_h$ is the angle between the normal N and the halfway vector H; $\theta_i$ is the angle between the normal N and the light vector L; and $\theta_o$ is the angle between the normal N and the viewing vector V.

In another example, an ellipse-based anisotropic illumination model determines the specular term of the BRDF and is defined by the following expression (3):

$$f_{s,3} = \left(\sqrt{\left(1 - \left(\frac{\cos^2\phi_h}{e_T} - \frac{\sin^2\phi_h}{e_B}\right)\right)}\right)^a$$

where a is a constant defining a shininess of a material, as may be used in a standard Phong-based reflection model. Again, in expression (3), $e_{T,B} \in (0,1]$.

Applying illumination to a sample point, for example at block 305 of the method shown in FIG. 3, comprises performing a method as described according to FIG. 1, further details of examples of which will be described here.

Returning to FIG. 1, as mentioned above, at block 101, the example method 100 comprises applying an anisotropic illumination model, such as one of the models described above, at a given sample point by determining, based on the volumetric dataset 200, one or more parameter values relating to one or more properties of the given sample point. In examples, example anisotropic models described above comprise parameters $e_T$ and $e_B$, and $\phi_h$ (or equivalently T and B) for which parameter values relating to a given sample point may be determined at block 101.

Considering the first sample point 211, in some examples determining a parameter value relating to a property of the dataset 200 at the first sample point 211 comprises determining a parameter value of $e_T$ and a parameter value of $e_B$ associated with the first sample point 211. Parameter values for $e_T$ and $e_B$ may be determined for the first sample point 211 based on, for example, the volumetric dataset 200 scalar value associated with the sample point 211. For example, parameter values for $e_T$ and $e_B$ may be determined for the sample point 211 during classification of the sample point 211 by use of a transfer function. In one example, parameter values for $e_T$ and $e_B$ may be assigned for a sample point based on the opacity at the sample point, as given by the transfer function. In one example, $e_T$ and $e_B$, may be assigned values based on an indication of the type of material the sample point 211 represents. For instance, a magnitude of the scalar value associated with the sample point 211 may be used to determine that the sample point 211 represents a bone material. A transfer function may then assign values for bone material to $e_T$ and $e_B$, where these values may be indicative of the characteristics of anisotropic specular highlights which are representative of what may be observed on bone material. Such values may be empirically determined in some examples, for example by performing measurements of the dimensions of specular highlights observed on bone material for a particular type of lighting, or, in other examples, such values may be defined by a user of the system. In some examples, parameter values at a given sample point for input as values of ellipse parameters in an anisotropic illumination model may be determined based on other properties at the sample point. For example, a magnitude and/or orientation of the gradient of the volume at the sample point may be used to determine a parameter value for input into an anisotropic illumination model.

The values of the tangent vector T and bitangent vector B at a given sample point are further examples of parameter values related to a property of the volumetric dataset 200; as described above, T and B determine the orientation of specular highlights produced by example ellipse-based illumination models. In order to provide particular parameter values for T and B for input into an anisotropic illumination model, a pair of perpendicular unit vectors lying in the tangent plane at the given sample point is defined. In examples, any one of the available pairs of perpendicular unit vectors lying in the tangent plane may be defined as the parameter values for T and B. In some examples, the pair of unit vectors for inputting as parameter values of T and B may be determined by defining a fixed vector, which may for example be labelled A, having a given orientation to the volumetric dataset 100. At a given sample point, the parameter value for T may then in one example be defined as the cross product of A with N normalised to unit length; i.e. A×N normalised to unit length. In this case, B at the given sample point is assigned the parameter value N×T normalised to unit length. Defining parameter values for T and B in this way, for input into an anisotropic illumination model, may be advantageous since it may produce illumination effects having a constant direction of anisotropy across the volume 100.

In examples of the present disclosure, one or more values relating to a curvature at a given sample point are determined as one or more parameter values relating to properties of the dataset 200 at the sample point. That is, block 101 may comprise determining one or more values relating to a curvature at the given sample point, as follows.

Returning to FIG. 4a and FIG. 4b, the surface 401 upon which point p lies, can be considered to have a curvature at the point p. On the surface 401, the curvature defines the change in a normal vector when applying infinitesimal positional changes on the surface 401 from the point p. The curvature at point p is thus based on second-order derivatives of the scalar field S with respect to position x,y,z at the point p on the surface 401.

In one example, a normal plane may be defined, where the normal plane is a plane containing the normal vector N at the point p. It should be appreciated that a set of normal planes may be defined, each defined by an azimuthal angle of rotation φ. The intersection of each normal plane with the surface 401, which is a two-dimensional surface, forms an intersection curve on each normal plane. From each intersection curve between the surface 401 and a normal plane, a curvature value κ at the point p may be determined, for example by determining a second-order derivative of the intersection curve.

In an example, by determining a curvature value for each of the normal planes, minimum and maximum curvatures for the point p can be determined. A minimum curvature $\kappa_1$ and a maximum curvature $\kappa_2$ may collectively be referred to as principal curvatures of the surface 401 at the point p. The principal curvatures $\kappa_1$ and $\kappa_2$ have associated with them tangential directions. The unit vectors denoting the tangential directions for the principal curvatures $\kappa_1$ and $\kappa_2$ are referred to as principal curvature directions, respectively $C_1$ and $C_2$. It is known from differential geometry that the principal curvature directions $C_1$ and $C_2$ are always orthogonal to one another.

The product of the principal curvatures $\check{K}=\kappa_1\kappa_2$ may be referred to as the Gaussian curvature, and the mean of the principal curvatures $\check{H}=(\kappa_1+\kappa_2)/2$ may be referred to as the mean curvature.

It will be understood that, for volumetric data and the scalar field s represented by that data, various methods may be used to determine principal curvatures and principal curvature directions. For example, methods described in the work of Kindlemann et al. (Curvature-based transfer functions for direct volume rendering: Methods and applications, In Visualization, 2003. VIS 2003. IEEE (pp. 513-520). IEEE) may be used to reconstruct principal curvatures and principal curvature directions from second-order partial derivatives of the scalar field. In some examples curvature values may be determined based on a smoothed version of the volumetric dataset 200. For example, smoothing of the volume may be performed prior to calculation of curvature values via use of a spatial smoothing filter such as a box filter, a tent filter or a Gaussian filter. Furthermore, example methods of determining curvature values for use in methods described herein may define a limit to the range of permitted curvature values. For example, in order to reduce variance in curvature measurements, principal curvature values may be limited to a range within a number k of standard deviations around the mean of the curvature values determined for the dataset. Here, k may, for example, be 1, 2 or 3.

At block 102 parameter values related to the given sample point are provided as inputs to the anisotropic illumination model being used. In some examples, parameter values determined at block 101 and relating to the given sample point are input into the anisotropic illumination model being used as values of parameters $e_T$ and $e_B$. In some examples, as described above, the parameter values determined for $e_T$ and $e_B$ for the given sample point are not related to curvature at the given sample point, instead being determined by a transfer function or the like. In some examples, however, parameter values determined at block 101 and relating to curvature at the sample point are provided as values of each of $e_T$ and $e_B$.

When determining an example parameter value for input into one of the above anisotropic illumination models, to account for the different ranges of $e_T$ and $e_B$ used in said models, a normalisation factor n may be defined. The normalisation factor n acts to map the range of determined parameter values to a range suitable for use as values of the parameters $e_T$ and $e_B$ in the given anisotropic illumination model being used.

Examples of parameter values which may be input as values of $e_T$ and $e_B$ will now be described. The below examples may be considered to define different mappings of curvature values to the ellipse-based values present in example anisotropic illumination models.

In one example, parameter values defining a locally normalised curvature at the given sample point are input as values of parameters $e_T$ and $e_B$. That is, an anisotropic illumination model may have parameters assigned parameter values as follows:

$$e_T = n\hat{\kappa}_1^{abs}$$

and $$e_B = n\hat{\kappa}_2^{abs}$$

wherein $$(\hat{\kappa}_1^{abs}, \hat{\kappa}_2^{abs}) = \left(\frac{(|\kappa_1|, |\kappa_2|)}{\|(|\kappa_1|, |\kappa_2|)\|}\right)$$

is the unit vector formed from the absolute values $|\kappa_1|$ and $|\kappa_2|$ of the two principal curvatures $\kappa_1$ and $\kappa_2$ at the sample point.

That is, in this example, the parameters defining the elongation of the ellipse in the particular anisotropic illumination model being applied in this example are assigned values dependent on the product of the normalisation value n and the components, $\hat{\kappa}_1^{abs}$ and $\hat{\kappa}_2^{abs}$, of the unit vector formed from the absolute values $|\kappa_1|$, $|\kappa_2|$ of the principal curvatures at the given sample point.

As mentioned above, n is the above-described normalisation factor for defining the range of values which may be input into a given anisotropic illumination model as values of the parameters $e_T$ and $e_B$. For example, when applying the model defined by expression (1) to determine a specular term at a sample point, i.e. determining the value of $f_{s,1}$ at the sample point, n has a value which may be greater than 1, because, in the expression for $f_{s,1}$, $e_{T,B} \in \mathbb{R}^+$. However, when applying either the model defined by expression (2) or the model defined by expression (3) to determine the specular term at the sample point i.e. determining a value for $f_{s,2}$ or for $f_{s,3}$, n=1 because in these models $e_{T,B} \in (0,1]$.

In another example, parameter values for input as values of the parameters $e_T$ and $e_B$ may be an inverse of locally normalised principal curvatures at the sample point. That is, parameter values may be assigned as follows:

$$e_T = n(1-\hat{\kappa}_1^{abs}); \text{ and}$$

$$e_B = n(1-\hat{\kappa}_2^{abs})$$

where $\hat{\kappa}_1^{abs}$ and $\hat{\kappa}_2^{abs}$ are the locally normalised principal curvatures defined as above.

In another example, a parameter value for input as one of the values of $e_T$ and $e_B$ may be a ratio of the locally normalised principal curvatures at the sample point. In examples, the other parameter value for input to the other of $e_T$ and $e_B$ may be normalisation value n. That is, parameter values may be assigned as follows:

$$e_T = n \frac{\min(\hat{\kappa}_1^{abs}, \hat{\kappa}_2^{abs})}{\max(\hat{\kappa}_1^{abs}, \hat{\kappa}_2^{abs})}; \text{ and}$$

$$e_B = n.$$

In another example, a parameter value for input as $e_T$ and $e_B$ may be Gaussian curvature calculated from the locally normalised principal curvatures at the given sample point, while the other parameter for input may be the normalisation value n. That is:

$$e_T = n \cdot \check{K}; \text{ and}$$

$$e_B = n$$

where $\check{K} = \hat{\kappa}_1 \hat{\kappa}_2$, and $\check{K}$ is the Gaussian curvature; and $(\hat{\kappa}_1, \hat{\kappa}_2)$ is the normalised unit vector formed from signed values of principal curvatures, i.e.

$$(\hat{\kappa}_1, \hat{\kappa}_2) = \left( \frac{(\hat{\kappa}_1, \hat{\kappa}_2)}{\|(\hat{\kappa}_1, \hat{\kappa}_2)\|} \right).$$

In another example a parameter value for input as values of parameters $e_T$ and $e_B$ may be a mean curvature, i.e. the mean of the components of the unit vector of locally normalised signed curvature, while the other parameter value for input may again be the normalisation value n. That is:

$$e_T = n \cdot \check{H}; \text{ and}$$

where $$\check{H} = (\hat{\kappa}_1 + \hat{\kappa}_2)/2.$$

In examples, parameter values determined at block 101 for vectors T and B may also be input at block 102. It should be noted that in practice this may mean selecting the orientation of the orthonormal basis used at the sample point, i.e. selecting a tangent vector T and a bitangent vector B. In practice, a parameter value input into a model may be a parameter value for $\phi_h$, which is dependent on T and B and appears in the above example anisotropic illumination models.

In some examples, a parameter value for the tangent vector T is selected, for example arbitrarily, from the set of possible tangent vectors lying in the tangent plane at the sample point. Conversely, a parameter value for the bitangent vector B, orthogonal to the tangent vector T may be selected and the tangent vector T uniquely defined by this selection.

In examples, parameter values for input into an anisotropic illumination model as values of parameters T and B relate to the curvature of the volumetric dataset 200 at the sample point. For example, the principal curvature directions $C_1$ and $C_2$ (which are unit vectors) at the sample point may be determined as described above and input into a model as values of the parameters T and B.

In one example, principal curvature direction $C_1$ may be input as a parameter value for the tangent vector T, i.e. $T = C_1$ and $C_2$ may be input as a parameter value for the bitangent vector B, i.e. $B = C_j$. As such, the orientation of the specular highlight produced by an example anisotropic illumination model may be configured to follow the principal curvature directions at the given sample point.

As can be seen from the above, in examples according to the present disclosure, parameter values relating to the curvature at a sample point at which an illumination effect is being applied may be input into an anisotropic illumination model being used, to thereby determine an anisotropic specular illumination effect value at the point. The illumination effect value, as described above is used to modulate the optical properties of the given point for accumulating into the sum of the values of the optical property along the ray being simulated. Therefore, example methods may achieve an anisotropic illumination effect which is dependent on the curvature of a surface at the given sample point. This may provide additional visual information to a viewer and enable a viewer to identify curved portions of an object, such as the object 210, within the volumetric dataset 200. In turn this may provide for increased realism in a rendered image of the volumetric dataset 200 provided to the viewer or improved perception by the viewer of, for example, boundaries, shape and depth within the volumetric dataset 200 from the resulting image.

In example methods of determining an illumination effect value during direct volume rendering, an anisotropic illumination model is selected, and one or more parameter values for inputting as values of parameters of the selected anisotropic illumination model are also selected. A selected anisotropic illumination model may be, for example, one of the above described ellipse-based models. Similarly, the one or more parameter values may be, for example, values as described above to be input as the values of parameters defining an ellipse and forming part of the selected illumination model. For example, the method 100 may, in some examples, comprise selecting a particular anisotropic illumination model for determining an illumination effect value to be applied at a particular sample point in the volumetric dataset 200. It will be appreciated that in some examples, the same anisotropic illumination model could be used at each sample point, while in other examples a different anisotropic illumination model could be selected to be applied at different sample points within the volumetric dataset 200. In yet other examples, an anisotropic illumination model may only be applied at selected sample points within the dataset 200. For example, an anisotropic illumination model may be applied at points in the dataset 200 where it is determined that an anisotropic illumination effect may be beneficial to a viewer's perception of that point. In such an example, a different illumination model, for example an isotropic local illumination model may be applied to determine illumination effect values at other points within the dataset 200, for example where anisotropic illumination effects are considered less likely to be of importance to a viewer's perception.

Similarly, selected parameter values for inputting into a selected anisotropic illumination model may differ for different sample points within the dataset 200. As such, the method 100 may comprise selecting a particular mapping of parameter values for inputting as values of parameters in the illumination model being used. Notably, any of the above options for controlling ellipse elongation, e.g. for inputting as parameter values of parameters $e_T$ and $e_B$, may be combined with any of the above options for controlling ellipse orientation, e.g. for providing input values for T and B. In some examples, the assignment of parameter values to parameters of a given anisotropic illumination model may be swapped. That is, for example, the above expressions for $e_T$ and $e_B$ may be reversed such that, for example $e_B = n(1-$ $\hat{\kappa}_1^{abs}$); and $e_7=n(1-\hat{\kappa}_2^{abs})$. Similarly, the parameter values input as values of T and B may be swapped, such that, in one example $T=C_2$ and $B=C_1$.

Selection of an anisotropic illumination model and/or a selection of parameter values and how they are input into the selected anisotropic illumination model at a particular sample point. i.e. how they are mapped to parameters of the selected illumination model, may be dependent on, for example, local criteria defining the sample point or its surrounding in the dataset 200. Examples of such criteria are surface properties, occlusion, depth, material, opacity, segmentation etc.

Figure 5:
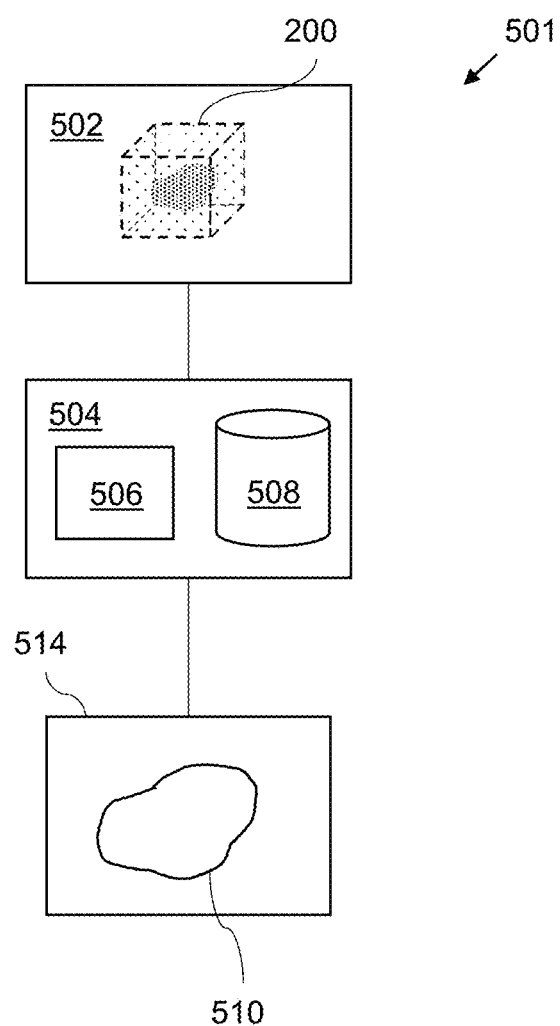
FIG. 5 illustrates schematically a system comprising an apparatus for rendering a volumetric dataset, according to an example embodiment.

Referring now to FIG. 5, there is illustrated schematically an example system 501 in which an example rendering apparatus 504 may be used. The system 501 comprises a scanner 502, the rendering apparatus 504, and a visualisation unit 514. In some examples, the system may comprise fewer components than or additional components to those illustrated in FIG. 5. For example, the system 501 may comprise a computer network such as the internet.

The scanner 502 may be any scanner for generating a dataset comprising the volumetric dataset 200, which, as described may, for example, be a medical volumetric dataset representing a portion of a patient. For example, the scanner 502 may be a computed tomography (CT) scanner, a magnetic resonance imaging (MRI) scanner, a positron emission tomography (PET) scanner, an ultrasound scanner or the like. In another example the scanner 502 may, for example, be for producing a volumetric dataset representing geological data. The scanner 502 is connected to the rendering apparatus 504, for example via wired or wireless connection. The scanner 502 may be arranged to provide the volumetric dataset to the rendering apparatus 504.

The rendering apparatus 504 comprises a processor 506 and a memory, in the form of a storage 508. In this example, the rendering apparatus 504 is arranged to perform the above described method of determining an illumination effect and/or of rendering the volumetric dataset. For example, the storage 508 may comprise a machine-readable medium comprising a set of machine readable instructions which when executed by the processor 506 cause the rendering apparatus 504 to perform an above-described example method. The program may be stored on a computer readable medium which may be read by the rendering apparatus 504 to thereby execute the program. The rendering apparatus 504 may be arranged to receive directly or indirectly or otherwise acquire from the scanner 502 the volumetric dataset 200.

The volumetric renderer 504 may comprise a processor for operating any rendering algorithm capable of simulating light transport within the volumetric dataset 200. An example suitable rendering algorithm is a ray casting method comprising a method of determining an illumination effect value as described above.

The rendering apparatus 504 may be arranged to transmit information, for example, a colour value for each pixel in a 2D image plane, to a visualisation unit 514. The transmission may be direct or indirect, for example via a wired connection, a wireless connection, or via the internet.

The visualisation unit 514 may comprise visualisation software for displaying a two-dimensional projection of a three-dimensional object 510. The visualisation unit 514 may comprise a display screen, and one or more graphics hardware or software components. In some examples, the visualisation unit 514 may be or comprise a mobile device. In some examples the visualisation unit 514 may comprise a virtual-reality device.

Although the invention has been described in the context of a direct volume rendering algorithm employing a ray casting approach, it should be appreciated that the invention may be applied in other example methods of visualising a volume. For example, any volume rendering method which comprises determining an illumination effect value may use a method of determining an illumination effect value by applying an anisotropic illumination model as described herein. For example, methods of determining an illumination effect described herein may be employed in volume rendering techniques such as path tracing, splatting, or shear warp.

The above embodiments are to be understood as illustrative examples of the invention. Other embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method of determining an illumination effect value of a volumetric dataset, the method comprising:
   determining, by one or more processors, one or more first parameter values based on the volumetric dataset, the one or more first parameter values relating to one or more properties of the volumetric dataset at a sample point; and determining, by the one or more processors, an illumination effect value relating to an illumination effect at the sample point by inputting the one or more first parameter values to an anisotropic illumination model, the illumination effect value defining a relationship between an amount of incoming light and an amount of outgoing light at the sample point, one or more second parameters of the anisotropic illumination model defining a major axis of an ellipse.

2. The method of claim 1, wherein the anisotropic illumination model is an ellipse-based model, and the inputting the one or more first parameter values inputs the one or more first parameter values as one or more values for the one or more second parameters.

3. The method of claim 1, wherein the one or more first parameter values relate to a curvature at the sample point.

4. A method of determining an illumination effect value of a volumetric dataset, the method comprising:

determining, by one or more processors, one or more first parameter values based on the volumetric dataset, the one or more first parameter values relating to one or more properties of the volumetric dataset at a sample point, and at least one of the one or more first parameter values being a principal curvature value or a principal curvature direction value at the sample point; and determining, by the one or more processors, an illumination effect value relating to an illumination effect at the sample point by inputting the one or more first parameter values to an anisotropic illumination model, the illumination effect value defining a relationship between an amount of incoming light and an amount of outgoing light at the sample point.

5. The method of claim 1, wherein the illumination effect value is a specular term of a bi-directional reflection distribution function (BRDF).

6. The method of claim 5, wherein the anisotropic illumination model is defined according to:

$$f_{s,1} = \frac{\sqrt{(e_T+1)(e_B+1)}}{8\pi} \cdot \frac{(N \cdot L)^{e_T \cos^2\phi_h + e_B \sin^2\phi_h}}{(N \cdot L) \cdot \max((N \cdot L), (N \cdot V))} \cdot F_r((V \cdot H))$$

wherein $f_{s,1}$ is the illumination effect value;

$e_T$ and $e_B$ are the one or more second parameters;

N is a normal vector at the sample point;

L is a light vector at the sample point;

V is a viewing vector at the sample point;

H is a halfway vector being halfway between L and V, and is defined as $$H = \frac{L+V}{\|L+V\|};$$

$F_r$ is a Fresnel term;

$\phi_h$ is an azimuthal angle between H and a tangent vector T; and $\cos \phi_h = (H \cdot T)$ and $\sin \phi_h = (H \cdot B)$, B being a bitangent vector B.

7. The method of claim 5, wherein the anisotropic illumination model is defined according to:

$$f_{s,2} = \frac{1}{\sqrt{\cos\theta_i \cos\theta_o}} \cdot \frac{\exp\left(-\tan^2\theta_h\left(\frac{\cos^2\phi_h}{e_T} + \frac{\sin^2\phi_h}{e_B}\right)\right)}{4\pi e_T e_B}$$

wherein $f_{s,2}$ is the illumination effect value;

$e_T$ and $e_B$ are the one or more second parameters;

$\theta_i$ is an elevation angle between a normal vector N at the sample point and a light vector L at the sample point;

$\theta_o$ is an elevation angle between the normal vector N and a viewing vector V;

$\theta_h$ is an elevation angle between the normal vector N and a halfway vector H, H being a vector halfway between L and V that is defined as $$H = \frac{L+V}{\|L+V\|};$$

$\phi_h$ is an azimuthal angle between the halfway vector H and a tangent vector T; and $\cos \phi_h = (H \cdot T)$ and $\sin \phi_h = (H \cdot B)$, B being a bitangent vector B.

8. The method of claim 5, wherein the anisotropic illumination model is defined according to:

$$f_{s,3} = \left(\sqrt{\left(1 - \left(\frac{\cos^2\phi_h}{e_T} - \frac{\sin^2\phi_h}{e_B}\right)\right)}\right)^a$$

wherein $f_{s,3}$ is the illumination effect value;

$e_T$ and $e_B$ are the one or more second parameters;

a is a constant defining a shininess of a material associated with the sample point;

$\phi_h$ is an azimuthal angle between a halfway vector H and a tangent vector T, H being a vector halfway between L and V that is defined as $$H = \frac{L+V}{\|L+V\|}.$$

and $\cos \phi_h = (H \cdot T)$ and $\sin \phi_h = (H \cdot B)$, B being a bitangent vector B.

9. The method of claim 6, wherein the one or more first parameter values include a plurality of first parameter values; and the inputting the one or more first parameter values inputs the plurality of first parameter values as values for $e_T$ and $e_B$.

10. The method of claim 9, wherein the inputting the plurality of first parameter values as values for $e_T$ and $e_B$ comprises;

inputting values for $e_T$ and $e_B$ as follows $n\,\hat{\kappa}_1^{abs}$ and $n\,\hat{\kappa}_2^{abs}$, $n(1 - \hat{\kappa}_1^{abs})$ and $n(1 - \hat{\kappa}_2^{abs})$, -continued $$n\frac{\min(\hat{\kappa}_1^{abs}, \hat{\kappa}_2^{abs})}{\max(\hat{\kappa}_1^{abs}, \hat{\kappa}_2^{abs})} \text{ and } n,$$

$n \cdot \tilde{K}$ and $n$, or $n \cdot \tilde{H}$ and $n$, wherein $$(\hat{\kappa}_1^{abs}, \hat{\kappa}_2^{abs}) = \left(\frac{(|\kappa_1|, |\kappa_2|)}{\|(|\kappa_1|, |\kappa_2|)\|}\right),$$

$$\tilde{K} = \hat{\kappa}_1\hat{\kappa}_2, \ \tilde{H} = (\hat{\kappa}_1 + \hat{\kappa}_2)/2, \text{ and } (\hat{\kappa}_1, \hat{\kappa}_2) = \left(\frac{(\hat{\kappa}_1, \hat{\kappa}_2)}{\|(\hat{\kappa}_1, \hat{\kappa}_2)\|}\right),$$

and
n is a normalisation value corresponding to the anisotropic illumination model.

11. The method of claim 6, further comprising:
providing a plurality of principal curvature directions as inputs for the tangent vector T and the bitangent vector B such that the tangent vector T and the bitangent vector B are each aligned with one of the plurality of principal curvature directions at the sample point.

12. A method of performing direct volume rendering of a volumetric dataset, comprising:
simulating a plurality of rays converging at a viewpoint and passing through the volumetric dataset;
selecting a plurality of sample points in the volumetric dataset along each of the plurality of rays;
classifying one or more optical properties of each of the plurality of sample points to obtain a classification of each of the plurality of sample points;
determining a respective illumination effect value for a respective sample point among the plurality of sample points by
determining, by one or more processors, one or more first parameter values based on the volumetric dataset, the one or more first parameter values relating to one or more properties of the volumetric dataset at the respective sample point, and
determining, by the one or more processors, the respective illumination effect value relating to an illumination effect at the respective sample point by inputting the one or more first parameter values to an anisotropic illumination model, the respective illumination effect value defining a relationship between an amount of incoming light and an amount of outgoing light at the respective sample point;
determining a respective value of the one or more optical properties at the respective sample point based on the classification of the respective sample point and the respective illumination effect value; and
accumulating a plurality of values of the one or more optical properties determined for at least one of the plurality of sample points along a respective simulated ray among the plurality of rays to obtain an accumulated value of the optical properties for use in rendering the volumetric dataset.

13. A non-transitory machine-readable medium storing a set of machine-readable instructions which, when executed by one or more processors, cause the one or more processors to execute the method of claim 1.

14. An apparatus, comprising:
one or more processors; and
a memory storing a set of machine-readable instructions which, when executed by the one or more processors, cause the one or more processors to perform the method of claim 1.

15. The method of claim 2, wherein the one or more first parameter values relate to a curvature at the sample point.

16. The method of claim 15, wherein at least one of the one or more first parameter values is a principal curvature value or a principal curvature direction value.

17. The method of claim 7, wherein
the one or more first parameter values include a plurality of first parameter values; and
the inputting the one or more first parameter values inputs the plurality of first parameter values as values for $e_T$ and $e_B$.

18. The method of claim 17, wherein the inputting the plurality of first parameter values as values for $e_T$ and $e_B$ comprises;
inputting values for $e_T$ and $e_B$ as follows $n \ \hat{\kappa}_1^{abs}$ and $n \ \hat{\kappa}_2^{abs}$, $n(1 - \hat{\kappa}_1^{abs})$ and $n(1 - \hat{\kappa}_2^{abs})$, $$n\frac{\min(\hat{\kappa}_1^{abs}, \hat{\kappa}_2^{abs})}{\max(\hat{\kappa}_1^{abs}, \hat{\kappa}_2^{abs})} \text{ and } n,$$

$n \cdot \tilde{K}$ and $n$, or $n \cdot \tilde{H}$ and $n$, wherein $$(\hat{\kappa}_1^{abs}, \hat{\kappa}_2^{abs}) = \left(\frac{(|\kappa_1|, |\kappa_2|)}{\|(|\kappa_1|, |\kappa_2|)\|}\right),$$

$$\tilde{K} = \hat{\kappa}_1\hat{\kappa}_2, \ \tilde{H} = (\hat{\kappa}_1 + \hat{\kappa}_2)/2, \text{ and } (\hat{\kappa}_1, \hat{\kappa}_2) = \left(\frac{(\hat{\kappa}_1, \hat{\kappa}_2)}{\|(\hat{\kappa}_1, \hat{\kappa}_2)\|}\right),$$

n is a normalisation value corresponding to the anisotropic illumination model.

19. The method of claim 8, wherein
the one or more first parameter values include a plurality of first parameter values; and
the inputting the one or more first parameter values inputs the plurality of first parameter values as values for $e_T$ and $e_B$.

20. The method of claim 19, wherein the inputting the plurality of first parameter values as values for $e_T$ and $e_B$ comprises:
inputting values for $e_T$ and $e_B$ as follows:

$n \ \hat{\kappa}_1^{abs}$ and $n \ \hat{\kappa}_2^{abs}$, $n(1 - \hat{\kappa}_1^{abs})$ and $n(1 - \hat{\kappa}_2^{abs})$, $$n\frac{\min(\hat{\kappa}_1^{abs}, \hat{\kappa}_2^{abs})}{\max(\hat{\kappa}_1^{abs}, \hat{\kappa}_2^{abs})} \text{ and } n,$$

$n \cdot \tilde{K}$ and $n$, or $n \cdot \tilde{H}$ and $n$, wherein $$(\hat{\kappa}_1^{abs}, \hat{\kappa}_2^{abs}) = \left(\frac{(|\kappa_1|, |\kappa_2|)}{\|(|\kappa_1|, |\kappa_2|)\|}\right),$$

$$\tilde{K} = \hat{\kappa}_1\hat{\kappa}_2, \ \tilde{H} = (\hat{\kappa}_1 + \hat{\kappa}_2)/2, \text{ and } (\hat{\kappa}_1, \hat{\kappa}_2) = \left(\frac{(\hat{\kappa}_1, \hat{\kappa}_2)}{\|(\hat{\kappa}_1, \hat{\kappa}_2)\|}\right),$$

n is a normalisation value corresponding to the anisotropic illumination model.

21. The method of claim 7, further comprising:
providing a plurality of principal curvature directions as inputs for the tangent vector T and the bitangent vector B such that the tangent vector T and the bitangent vector B are each aligned with one of the plurality of principal curvature directions at the sample point.

22. The method of claim 8, further comprising:
providing a plurality of principal curvature directions as inputs for the tangent vector T and the bitangent vector B such that the tangent vector T and the bitangent vector B are each aligned with one of the plurality of principal curvature directions at the sample point.

* * * * *